June 7, 1966  J. B. DEE, JR  3,255,092
CONTROL RODS
Filed March 24, 1961  2 Sheets-Sheet 1
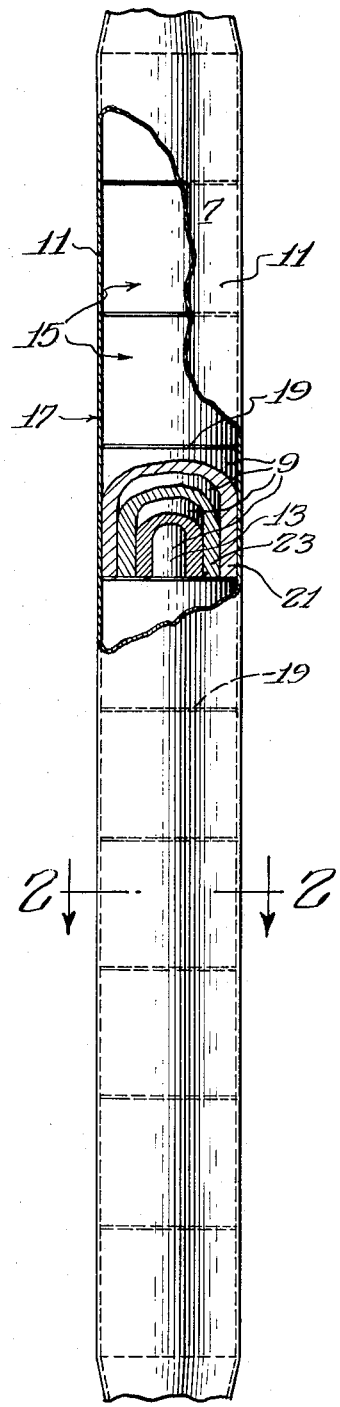
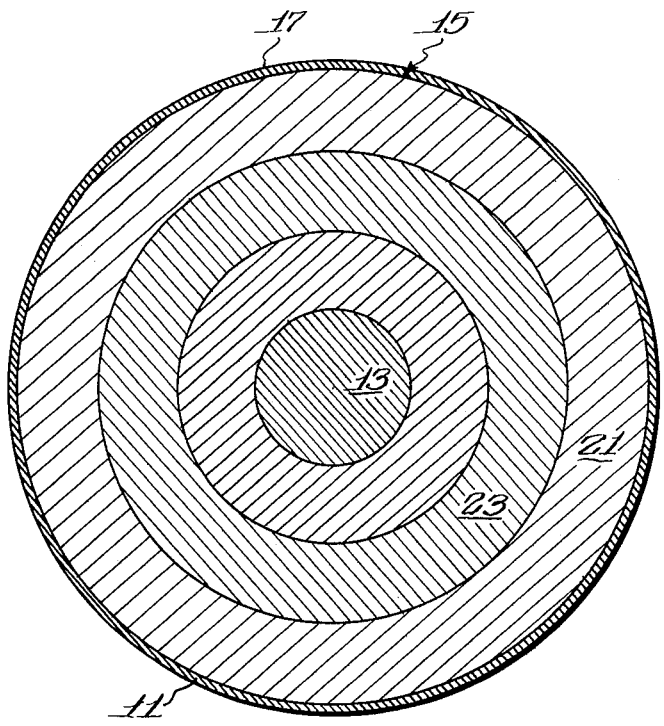
Inventor:
John B. Dee, Jr.
By Soans, Anderson, Luedeka & Wild
Attys.

June 7, 1966      J. B. DEE, JR      3,255,092
CONTROL RODS
Filed March 24, 1961      2 Sheets-Sheet 2

Inventor:
John B. Dee, Jr.

3,255,092
CONTROL RODS
John B. Dee, Jr., Rancho Santa Fe, Calif., assignor to General Dynamics Corporation, New York, N.Y., a corporation of Delaware
Filed Mar. 24, 1961, Ser. No. 98,160
7 Claims. (Cl. 176—86)

The present invention generally relates to means for controlling reactivity of a nuclear reactor and more particularly relates to neutron absorbing rods for a nuclear reactor.

A nuclear reactor generally includes an active core containing fuel (fissionable material), a moderating material, a reflector to conserve escaping neutrons, control and measuring elements, provision for heat removal, and suitable shielding.

When a reactor is constructed, it contains more than the critical amount of fissionable fuel so that the effective multiplication factor (i.e., the ratio of the number of neutrons produced by fission in each generation to the number of neutrons present in the preceding generation) can be made greater than one. Normally, the multiplication factor is controlled by the introduction into the reactor of one or more control rods which absorb neutrons in the reactor, thereby rendering them unavailable for fissioning.

The power output of a reactor is proportional to the neutron flux and the density of neutrons in the reactor. A change in power output can be readily caused, either by at least partially withdrawing control rods from the reactor core to make the multiplication factor greater than one, thereby increasing the power output, or by at least partially inserting control rods into the reactor core to make the multiplication factor less than one, thereby decreasing the power output. When the power reaches a desired level, the control rods are then repositioned sufficiently to restore the multiplication factor to one. In a given reactor, the rate at which the neutron density, and therefore power output, increases or decreases depends upon the amount by which the multiplication factor is greater or less, respectively than one. To shut down the reactor, the control rods are inserted sufficiently far into the reactor core to reduce the multiplication factor to considerably less than one (provide a negative reactivity), thereby causing neutron density and the power output to decrease to a negligible level.

To effectively control the operation of the reactor, it is necessary to provide the reactor with a control system which is capable of moving the control rods to any desired position in the reactor core. Also, it is necessary to provide the control system with means for suddenly shutting down the reactor for safety or other reasons.

Over a period of time, the reactor undergoes a reduction in excess reactivity with an accompanying reduction in neutron flux, which reduction may be linear or non-linear, depending on the parameters of the reactors. This is due in large part to fuel burn-up, and also partially due to the gradual accumulation of neutron absorbers resulting from the fission process. The reduction in neutron flux is in turn accompanied by a decrease in the power output of the reactor. In order to compensate for or prevent such decrease over the operational life of the reactor, it is usually necessary to continually reposition the control rods in the reactor core, each time in a sufficient amount so that the neutron flux and power output can be maintained at substantially constant levels.

Control rods generally are of unitary construction and specially adapted to meet the requirements of a given nuclear reactor. They have little utility in reactors having parameters distinct from the parameters of the reactor for which they were designed.

Improved control rods are now provided, in accordance with the present invention, which control rods have adaptability for use in a number of nuclear reactors having different parameters. The control rods are constructed in a manner which allows the components thereof to be standardized and to be interchangeable. From such standardized components, assembly of individual control rods to satisfy requirements of given reactors is relatively simple. Moreover, the improved control rods are capable of readily compensating for or preventing the described decrease in neutron flux and power output with time without necessitating frequent repositioning of the control rods in the reactor. Furthermore, the improved control rods can be constructed in a manner which allows relatively fine adjustment of and accurate control of the reactivity of the reactor.

Accordingly, it is a principal object of the present invention to provide control rods for nuclear reactors. It is also an object of the present invention to provide an improved type of neutron absorbing control rod, the components of which can be readily standardized so that assembly of the control rod to meet the requirements of a given nuclear reactor can be readily carried out. It is a further object of the present invention to provide an improved control rod which can be adapted for use in a plurality of nuclear reactors. It is a still further object of the present invention to provide at least one control rod capable of readily compensating for reductions in reactivity, neutron flux and power output in the reactor over a period of time. Further objects and advantages of the present invention will be apparent from a study of the following detailed description and of the accompanying drawings of which:

FIGURE 1 is a fragmentary side elevation of a portion of one embodiment of the improved control rod of the present invention, portions being broken away to illustrate the internal construction thereof;

FIGURE 2 is an enlarged sectional view taken along the section line 2—2 of the FIGURE 1; and, FIGURE 3 depicts two graphs illustrating loss of reactivity during reactor life.

Figure 3:
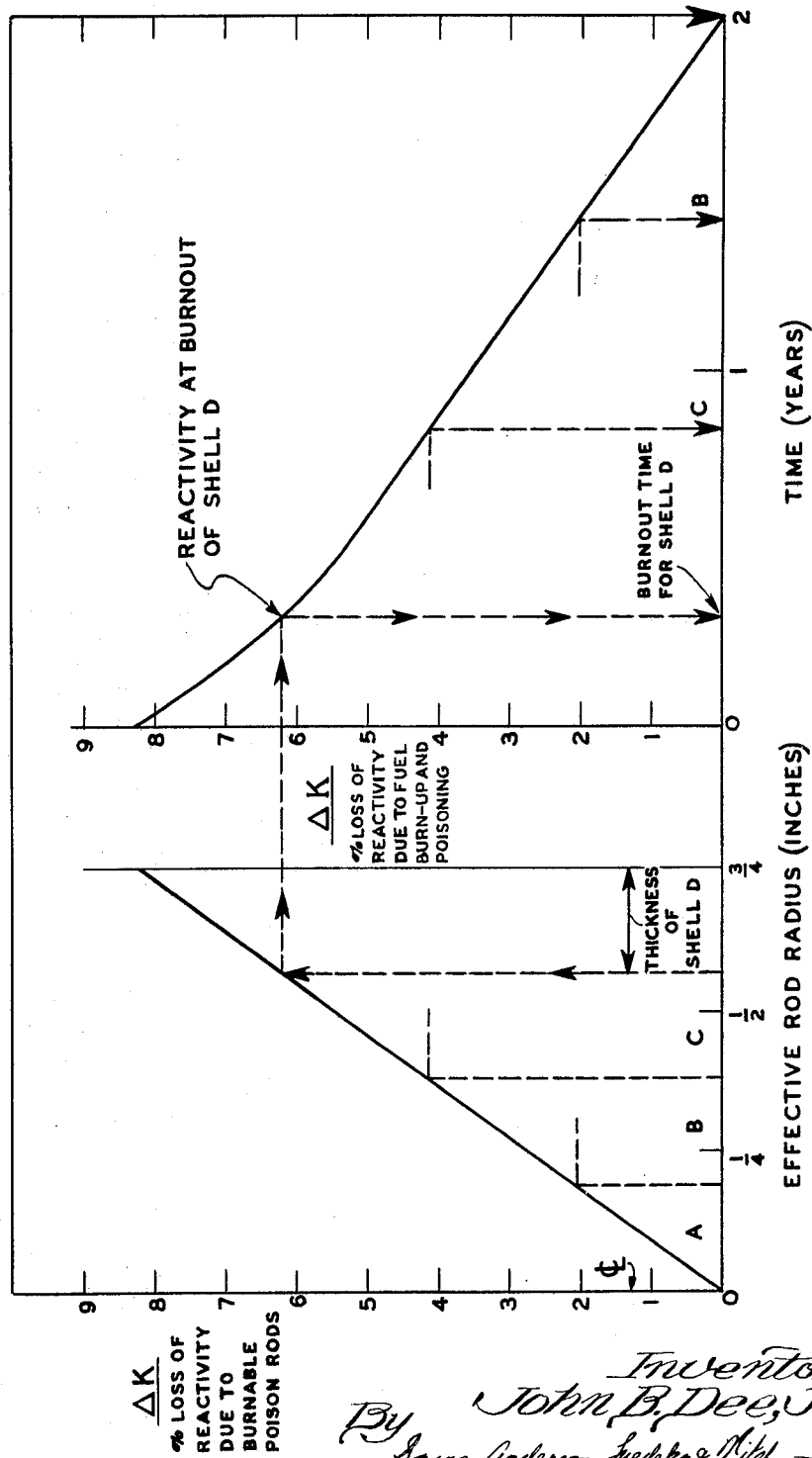

The present invention essentially comprises at least one control rod for a nuclear reactor. Each rod includes a plurality of sections. More particularly, each section includes a burnable poison, that is a burnable material having high neutron absorption cross section, which poison is uniformly dispersed throughout the section in a predetermined concentration. The poison may, if desired, be present in a suitable temperature stable filler material and the concentration of poison may vary from section to section, depending upon the requirements of the reactor. The plurality of sections may be disposed within an outer can of suitable material, such as metal or the like to facilitate handling, and to provide increased structural strength and protection for the sections. There may be within each control rod one or more units or assemblies of sections. Thus, a given control rod may contain a plurality of units of sections, each unit, for example, being stacked upon the next to form a control rod of substantial length. Alternatively, each section may extend the entire length of the active portion of the control rod.

The indicated arrangement of a plurality of sections allows great flexibility for the assembly of a control rod to meet requirements of a given reactor. Thus, a plurality of sections can be standardized with respect to a plurality of poison concentrations and sizes and shapes. Individual sections can then be selected and assembled together in any suitable manner to make up a unit and one or more units may then be inserted within the outer container or can in a given order to provide a rod to satisfy requirements of a given reactor or series of reactors. Specifically, the control rods can be constructed so that the reactivity loss within the reactor is compensated for, throughout the operating life of the control rods, without necessitating repositioning of the control rods in the core in order to maintain a given neutron flux and power output. The overall control rod shape may also vary from point to point, corresponding to variations in neutron density at different levels in the reactor core.

Now, referring more particularly to FIGURE 1 of the accompanying drawings, FIGURE 1 illustrates in side elevation a portion of a preferred embodiment of the control rod of the present invention. As illustrated, a plurality of nested concentric sections in the form of shells, generally designated 9, are provided. The shells may be of any suitable size and shape commensurate with reactor parameters. Moreover, they are dimensioned with respect to each other so that they can be readily assembled together. For example, they can be dimensioned so that they slidably engage each other in nested relation. Moreover, the outermost shell can be dimensioned so that it slidably engages an outer container or can within which the shells can be disposed. Alternatively, the shells and can may be pressure fitted together to reduce voids or spaces therebetween. Other methods of assembly are also contemplated.

For most purposes, the shells can be satisfactorily fabricated in a generally cylindrical form, such as those illustrated in FIGURE 2. However, if desired, the shells can be generally square, oval, rectangular, polygonal, etc., in cross section. Each shell, except the innermost shell, has a hollow center to receive therewith nested shells, as shown in FIGURE 2. However, the innermost shell 13 need not have a hollow center and, as shown in the embodiment illustrated in FIGURE 2, may, if desired, have a solid center.

Each shell may be fabricated from suitable filler material having structural stability at the operating temperature of the nuclear reactor. Thus, the filler material may be aluminium, zirconium or other metal, but is preferably a high temperature ceramic such as alumina, beryllia, zirconia or other suitable refractory metal oxide or the like. The burnable poison is uniformly dispersed throughout the filler material in each shell. The poison may be selected from any suitable burnable material having high neutron absorption cross section, and is preferably present in finely divided particulate form within the filler material, as illustrated in FIGURE 2. The control rod will have most widespread use in nuclear reactors operating with thermal neutrons. In such instances, a poison will be utilized which has high absorptivity for thermal neutrons. The poison is preferably selected from the group consisting of gadolinium metal, compounds of gadolinium, cadmium metal, cadmium compounds, samarium metal, samarium compounds, and mixtures of said metals and/or compounds.

Gadolinium is a particularly suitable poison, since it has the largest thermal neutron absorption cross-section of the indicated preferred materials and also exhibits relatively small epithermal absorption, i.e., it absorbs neutrons in the epithermal energy range (above thermal) only to a relatively small extent. Samarium has the next largest thermal neutron absorption cross-section, but has the disadvantage of absorbing neutrons of energies above thermal to a greater extent than gadolinium Cadmium is a particularly suitable thermal neutron absorber, especially since it absorbs epithermal neutrons to only a very slight extent. Both cadmium and samarium are effectively single isotope absorbers and accordingly are particularly suitable for a constant poison burnout rate. Either gadolinium–155 or gadolinium–157 could be effectively utilized as the poison, as could samarium–149 and cadmium–113, in metal or compound form. In the case of gadolinium–157, it has been found that a very small particle size is usually required for best results. Thus, the particles may be approximately 0.33 micron.

Various compounds of the indicated poison metals may be used, such as gadolinium oxide, samarium oxide, cadmium oxide and the like. Any such compound which is compatible with the filler material and is temperature stable and which does not decrease the thermal neutron absorbing efficiency of the poison metal to any substantial extent can be utilized.

The poison may be dispersed uniformly within the filler material during fabrication of the shell by any suitable means. For example, powdered filler material can be uniformly mixed with a suitable concentration of powdered poison and then the powdered mixture can be fabricated to desired size and shape into a finished ceramic by any conventional ceramic forming and finishing process. Thus, the powdered mass can be placed in a die and subjected to hot pressing, with or without subsequent finishing operations to provide the shell with dimensions within required limits.

For most purposes, the wall of each shell will have a thickness of a fraction of an inch or so and each shell may be any desired length corresponding to the entire length of the control rod or only a fraction thereof. For most purposes, it is more satisfactory to provide shells of only a very few inches in length. A plurality of nests or units 15 of said shells, as shown in FIGURE 1, can be stacked upon each other to any desired height to form the active portion 17 of the control rod. Such an arrangement permits maximum flexibility in adjusting the poison concentration in the control rod from point to point along its axial length to compensate for variations in neutron density within the active portion of the reactor core. The total diameter of each shell will vary, according to the parameters of the reactor and according to where it is to be positioned in a particular nest 15 of shells and may be between a fraction of an inch and several inches or more. A typical example of a nest or unit of shells for the control rod, in accordance with the present invention, is illustrated in FIGURE 2. Four concentric shells 9 are shown, the shells 9 being nested together to form a control rod unit 15 having, for example, an overall shell diameter of about 1.46 inches. A plurality of such units 15 may, for example, be disposed in stacked relation within the can for an overall length of about 14 inches, corresponding to the length of the active portion of a given reactor core into which the control rod is to be inserted.

The stacked units 15 of nested shells may be separated from one another, if desired, by suitable spacer discs 19 or the like, as illustrated in FIGURE 1. Such spacer discs may be formed of any suitable temperature stable material, such as a metal, for example, aluminum, zirconium, stainless steel, etc., or ceramics, such as a refractory metal oxide, for example alumina, beryllia, zirconia, etc., or other material. The discs may be any suitable size and shape, but preferably are very thin, solid, and cylindrical. They may, for example, be a small fraction of an inch in thickness and the diameter of the units 15 of shells.

The can 11 illustrated in FIGURES 1 and 2 of the accompanying drawings and disposed around the units 15 of shells and the discs 19 may be formed of any suitable material which is stable at the operating temperature for the reactor. For example, the can may be formed of aluminum, zirconium alloy, stainless steel or the like metal. Alternatively, ceramics can be utilized, as well as other high temperature materials. The thickness of the can wall may vary, as desired. Usually, a relatively thin wall, a small fraction of an inch thick, is sufficient.

The can may be dimensioned so that the units of shells can be slid thereinto in stacked relation. If desired, the tightness of the fit between the outer surface of each outer shell 21 and the inner surface of the can 11 also can be increased by pressure fitting, etc. Alternatively, the can may be disposed as a cladding on the outer surface of each outer shell 21 of each unit of an assembled stack of units. Other methods of assembly of the shells and can will be obvious to those skilled in the art.

However, it is not essential for the purposes of the present invention that a can be present if the material forming the shell is non-reactive with the environment (inside and outside the reactor core), and only one unit 15 of shells is to be utilized in the control rod. The can, where present, not only facilitates handling of the control rod and increases the structural strength thereof, but also protects the shells from the reactor coolant and other environment. Furthermore, it serves as a support for a stack of units of nested shells. Accordingly, in many practical applications, a can will be present.

It will be understood that the remainder of the control rod (not shown), i.e., the inactive portion (if any) can be constructed in any suitable manner, and may include, for example, a conventional upper portion or head suitably shaped to permit easy withdrawal, insertion and positioning of the control rod with respect to the reactor core, as by detachable connection to suitable grappling means, etc. (not shown). Such a head may be fabricated from any suitable material, for example, metal, such as aluminum, stainless steel or the like. The control rod may also be provided with a conventional bottom inactive portion or end (not shown), if desired, shaped to facilitate vertical alignment and support of the control rod in the reactor core. In this regard, the bottom of the control rod can, for example, be equipped with a coupling or stem (not shown) which fits a suitable aperture (not shown) in the bottom grid plate of the reactor core. Other suitable arrangements are also contemplated. It will be understood that the active portion of the control rod when fully inserted in the reactor core should be positioned in and correspond to the active portion of the reactor core, for maximum effectiveness.

The total concentration of poison needed for the reactor can be determined. Thus, knowing the expected fuel consumption over a given reactivity lifetime, the fuel coefficient, and the reactivity change, the number of neutrons to be removed by poison can be calculated. This number equals the number of poison atoms required. The diameter, length, and number of rods to be utilized determine the required overall concentration of the poison.

The concentration of poison to be disposed within each shell of each unit of the control rod or rods should be selected or programed so that the loss in excess reactivity in the reactor core with time is fully compensated for by the programed burnout of the control rods.

Such poison is selected so as to be burnable. Gadolinium, samarium, cadmium and their compounds are suitable burnable poisons. The initial absorption by the burnable poison depends upon the total area of the active portion 17 of the rod, i.e., the initial effective absorbing area of the outer shell 21. This is a measure of the reactivity worth of the rod. However, the effective thermal neutron absorbing area of the rod decreases with time so that the reactivity worth of the rod decreases with time.

The burnable poison concentration in the outer shell 21 of each unit 15 of the control rod 7 can be arranged so that the outer shell 21 is initially black or wholly absorbing for thermal neutrons contacting the same. Since the amount of burnable poison absorber decreases at a constant rate in a constant flux environment, the rate at which the outer shell gradually becomes transparent or non-absorbing for thermal neutrons can be predetermined. So also can the rates for the remaining shells. However, even after the outer shell becomes transparent to thermal neutrons, it still may be effective in absorbing some neutrons of other energy levels. The next underlying shell 23 is contacted over a period of time (as the outermost shell undergoes transparency) with increasing concentrations of thermal neutrons. The particular arrangement of the shells of the rod, in accordance with the present invention, tends to at least initially restrict such contact to one with neutrons of a narrower energy range than the range of energies of neutrons to which the outermost shell is subjected, i.e., the outermost shell to some extent may still act as a screen or absorber, thereby increasing the longevity of shell 23. This procedure continues stepwise as each underlying shell in turn is exposed to neutrons, due to gradually increasing transparency of the overlying shells.

Another factor to consider is that the initial rate of reactivity loss in the reactor may be relatively large during buildup of equilibrium poison in the fuel. The outer shell or shells of the control rod may thus be provided with a smaller concentration of burnable poison than the remaining shells so as to accurately compensate for such initially high rate of reactivity loss.

The neutron flux tends to gradually decrease with time in a predetermined manner, due to fuel burnup and accumulation of poison in the fuel. Thus, the *necessary* burnable poison concentration of the respective shells, to program poison burnout to decrease in reactivity, is that which is sufficient to maintain the neutron flux and power output at relatively constant levels without repositioning the control rods in the core despite the continuing reactivity loss with time in the reactor.

The following example illustrates the requirements for a specific type of nuclear reactor.

EXAMPLE

A nuclear reactor of a type generally known as the Triga, such as is disclosed in copending U.S. application Serial No. 732,415, Theodore Brewster Taylor et al., now U.S. Patent No. 3,127,325, may be constructed so as to employ uranium–238 enriched with uranium–235 for a total uranium–235 concentration of 5 kilograms distributed in a total of 114 stainless steelclad fuel elements, each having a total length of 21 inches and an active portion of 14 inches. The uranium is present in 8 wt. percent concentration with 92 wt. percent concentration of zirconium hydride in each fuel element. The reactor has a fuel consumption of a about 0.9 kilogram for a reactivity lifetime of 2 mw. years. The fuel coefficient is approximately 0.4, and the approximate reactivity change over the life of the reactor is 7 percent due to fuel burnup and 1.3 percent due to poison accumulation in the fuel. The total number of neutrons to be removed by the burnable poison over the total period of time can be calculated as follows: $n = .07\tfrac{1}{2} \times {}^{900}\!/_{235} \times .6 \times 10^{24} = 10^{23}$ neutrons $= 0.115$ mole. An equal number of poison atoms will remove this many neutrons provided the cross section is sufficiently high for the poison atoms so that no significant residual poison remains at the end of life. Accordingly, approximately 58 grams of gadolinium or 92 grams of cadmium are needed.

The diameter and the number of the burnable poison control rods to be used in the reactor are determined by the desired dilution of the required poison. A thermally black 1.50-inch diameter control rod in a convenient location in the reactor core has a reactivity worth of about —$2 at the reactor operating temperature, for example, about 280° C. Initial excess reactivity for the reactor is calculated to be approximately $12, so that 6 such burnable poison conrtol rods are required for initial excess reactivity compensation. This is in addition to a central control rod of another type (containing 5 wt. percent cadmium, 15 wt. percent indium and 80 wt. percent silver disposed in a zircalloy or stainless steel can).

FIGURE 3 of the accompanying drawings depicts two graphs, one graph illustrating the 8.3 precent reactivity loss over a two year period for the particular reactor and the other graph correlating the same percentage of reactivity loss with the effective radius of the burnable poison rods of FIGURE 1 for the reactor. Thus, sufficient poison is present in the rods initially to compensate for the excess reactivity at the beginning of operation of the reactor. As the excess reactivity is lost (due to fuel burnup and poison accumulation), the effective control rod radius correspondingly, according to program, decreases (due to poison burnup therein), so as to maintain the desired steady state of neutron flux and power output without necessitating repositioning the control rods in the reactor core. Knowing the total amount of burnable poison necessary and the reactivity compensation needed at each point in time the necessary poison concentration for the respective shells of the control rods can be readily calculated.

Each of the 6 burnable poison control rods under consideration is constructed, as illustrated in FIGURES 1 and 2 of the accompanying drawings. Thus, each of such control rods comprises 10 nests or units 15 of shells 9 disposed within a stainless steel can 11. Each nest is formed of 4 concentric shells in nested relation. Each shell, except the innermost shell, has a shell wall thickness of .1824 inch. The innermost shell is solid and has a diameter of .3648 inch. Thus, the total diameter of the nested shells is 1.46 inches. The can has a wall thickness of 0.20 inch, so that the overall diameter of the control rod is 1.50 inches. The overall length of the control rod is 21 inches, with an active portion length of 14 inches. The remainder of the control rod may comprise supporting elements, etc. (not shown in FIGURE 1).

Disposed between each of the nests 15 of shells stacked in the can 11 is a spacer disc fabricated of stainless steel and about 0.028 inch thick and having a diameter of 1.46 inches.

Each shell is fabricated by hot pressing in a die a particulate mixture of alumina, $Al_2O_3$ and gadolinium oxide, $Gd_2O_3$, in accordance with a conventional hot pressing ceramic-forming technique, to form a solid ceramic with the gadolinium oxide uniformly dispersed in the alumina in each shell. The gadolinium oxide is transparent to resonance neutrons.

The concentration of gadolinium oxide in the alumina varies from shell to shell both axially and radially in the burnable poison control rod to compensate for the rate of reactivity loss (FIGURE 3, i.e., by distribution of concentration of gadolinium oxide from shell to shell radially) and to compensate for variations in neutron flux distribution in the core (distribution of concentrations of gadolinium oxide from shell to shell axially). The neutron flux is greatest at the midline or center of the reactor core and falls off towards the top and bottom of the core, following a distribution approximating a truncated cosine curve for the particular reactor.

The following table sets forth the gadolinium oxide concentration in each shell of each nest or unit of shells of each of the 6 control rods under consideration. In the table and shells of each unit are identified by the letters A, B, C and D, beginning at the center and proceeding radially, i.e., A is the innermost shell, B is the next outer shell radially, C is the third shell radially and D is the outer shell. Moreover, the ten nests or units are identified by the numbers 1 to 10, from the top to the bottom of the active portion of the control rod. The poison concentrations vary symmetrically about the midplane of the rod.

Table

| Nest Nos. | Shell | Concentration of Burnable Poison ($Gd_2O_3$), gms./cc. of alumina |
| --- | --- | --- |
| 1 and 10 | A | 0.035 |
|  | B | 0.035 |
|  | C | 0.030 |
|  | D | 0.020 |
| 2 and 9 | A | 0.040 |
|  | B | 0.040 |
|  | C | 0.030 |
|  | D | 0.025 |
| 3 and 8 | A | 0.040 |
|  | B | 0.040 |
|  | C | 0.030 |
|  | D | 0.025 |
| 4 and 7 | A | 0.045 |
|  | B | 0.045 |
|  | C | 0.030 |
|  | D | 0.025 |
| 5 and 6 | A | 0.045 |
|  | B | 0.045 |
|  | C | 0.035 |
|  | D | 0.025 |

Accordingly, the burnable poison control rod of the present invention is constructed in a manner which permits easy adjustment of poison concentration therein, preferably both radially and axially for accurate compensation of both reactor reactivity loss with time and difference in neutron flux at various levels in the reactor core.

Although the foregoing description has been specifically related to the embodiment set forth in FIGURES 1 and 2 of the accompanying drawings, it will be understood that such description is equally applicable to other arrangements for the sections and units of the control rods, which other arrangements are also within the scope of the present invention. Thus, for example, each section, instead of being in the form of a shell, may be a solid slab or the like of suitable size and shape. A plurality of such slabs, each with a predetermined concentration of burnable poison, may be disposed side by side and may extend throughout all or a part of the length of the active portion of each control rod, i.e., one or a plurality of units may be present. The slabs may be joined by suitable bonding material and techniques or may be slidably disposed in abutting relation within a can or the like, such as previously described. The slabs may vary in size and/or shape, as well as in poison concentration, in accord with the foregoing criteria.

Alternatively, solid or hollow sections of identical or non-identical shape can be stacked one above the other to provide the active portion of the control rods. Such sections can be bonded together or disposed in slidable engagement within an outer can.

It will be understood that the overall shape of each control rod need not be cylindrical in cross-section, but instead, may be rectangular, oval, irregularly shaped, etc. The respective sections within each unit may be of identical or nonidentical shape and size, with respect to each other, and where a plurality of units are present, the units may be of identical or non-identical size and shape. In any event, the sections are arranged so that the continuous loss in excess reactivity in the reactor core with time is compensated for over the life of the control rods.

The described burnable poison control rods are believed to be unique in the arrangement of each in the form of a plurality of sections, each section containing a predetermined concentration of burnable poison programmed to acomplish the described purposes. The poison is preferably uniformly dispersed within suitable filler material. The sections can be standardized with regard to various poison concentrations and shapes and sizes, so as to be completely interchangeable for simple assembly into individual units or a plurality of units to form control rods of the present invention. Accordingly, the adaptability of the control rods of the present invention to a number of different nuclear reactors is substantially increased.

Other advantages of the present invention are as set forth in the foregoing description.

Various of the features of the present invention are set forth in the appended claims.

What is claimed is:

1. An elongated control rod for a nuclear reactor, which control rod comprises a plurality of neutron-absorbing portions of predetermined geometric shapes arranged transversely across the control rod, each of said portions containing a predetermined concentration of burnable poison, the concentration of burnable poison in said portions varying between portions, said varying concentrations being so preselected that the effective neutron-absorbing cross-sectional area of the rod decreases in a programed manner as a result of programed burnout progressively inward from the exterior of the rod, which decrease in effective cross-sectional area is proportional to the decrease in excess reactivity of the nuclear reactor core in which the rod is disposed.

2. An elongated control rod for a nuclear reactor, which control rod comprises a plurality of neutron-absorbing portions of predetermined geometric shapes arranged transversely across the control rod, said portions extending a substantial distance longitudinally of the control rod and each of said portions containing a predetermined concentration of burnable poison, the concentration of burnable poison in said portions varying between portions, said varying concentrations being so preselected that the effective neutron-absorbing cross-sectional area of the rod decreases in a programed manner as a result of programed burnout progressively inward from the exterior of the rod, which decrease in effective cross-sectional area is proportional to the deacrese in excess reactivity of the nuclear reactor core in which the rod is disposed.

3. An elongated control rod for a nuclear reactor, which control rod comprises a plurality of neutron-absorbing portions of predetermined geometric shapes arranged transversely across the control rod, each of said portions containing a predetermined concentration of a burnable poison selected from the group consisting of gadolinium, cadmium, samarium and mixtures thereof, the concentration of burnable poison in said portions varying between portions, said varying concentrations being so preselected that the effective neutron-absorbing cross-sectional area of the rod decreases in a programed manner as a result of programed burnout progressively inward from the exterior of the rod, which decrease in effective cross-sectional area is proportional to the decrease in excess reactivity of the nuclear reactor core in which the rod is disposed.

4. An elongated control rod for a nuclear reactor, which control rod comprises a plurality of neutron-absorbing sections of similar geometric shapes arranged transversely across the control rod and nested one within another, said sections extending a substantial distance longitudinally of the control rod and each of said sections containing a predetermined concentration of burnable poison, the concentration of burnable poison in said sections varying between sections, said varying concentrations being so preselected that the effective neutron-absorbing cross-sectional area of the rod decreases in a programed manner as a result of programed burnout progressively inward from the exterior of the. rod, which decrease in effective cross-sectional area is proportional to the decrease in excess reactivity of the nuclear reactor core in which the rod is disposed.

5. An elongated control rod for a nuclear reactor, which control rod comprises a plurality of neutron-absorbing sections of similar geometric shapes arranged transversely across the control rod and nested one within another, each of said portions containing a predetermined concentration of burnable poison selected from the group consisting of gadolinium, cadmium, samarium and mixtures thereof, the concentration of burnable poison in said sections varying between sections, said varying concentrations being so preselected that the effective neutron-absorbing cross-sectional area of the rod decreases in a programed manner as a result of programed burnout progressively inward from the exterior of the rod, which decrease in effective cross-sectional area is proportional to the decrease in excess reactivity of the nuclear reactor core in which the rod is disposed.

6. An elongated control rod for a nuclear reactor, which control rod comprises a plurality of concentric neutron-absorbing cylindrical shells of different diameters arranged transversely across the control rod and nested one within another, each of said shells containing a predetermined concentration of burnable poison, adjacent nested shells having concentrations of burnable poison that generally decrease radially outward from the center of the rod in a preselected manner so that the effective neutron-absorbing cross-sectional area of the rod decreases in a programed manner, which decrease in effective cross-sectional area is proportional to the decrease in excess reactivity of the nuclear reactor core in which the rod is disposed.

7. An elongated control rod for a nuclear reactor, which control rod comprises a plurality of units of concentric neutron-absorbing shells of different diameters nested one within another and being generally coextensive in length, each of said shells being formed of a burnable poison having a high thermal neutron absorption cross section uniformly dispersed within a matrix of alumina, said burnable poison including gadolinium oxide, each of said shells containing a predetermined concentration of burnable poison, adjacent nested shells having concentrations of burnable poison that generally decrease radially outward from the center of the rod in a preselected manner so that the effective neutron-absorbing cross-sectional area of the rod decreases in a programed manner as a result of the programed burnout progressively inward from the exterior of the rod, which decrease is proportional to the decrease in excess reactivity of the nuclear reactor core in which the rod is disposed, the overall concentrations of burnable poison in said units also varying from unit to unit along the longitudinal axis of the control rod to compensate for variations in neutron flux at different levels in the reactor core, said plurality of units of nested shells being disposed in vertically stacked relation within an outer can formed of stainless steel, and stainless steel spacers interposed between adjacent units to separate units from one another.

References Cited by the Examiner

UNITED STATES PATENTS

| | | | |
|---|---|---|---|
| 2,859,163 | 11/1958 | Ploetz | 204—193.3 |
| 2,866,741 | 12/1958 | Hausner | 204—193.3 |
| 3,030,294 | 4/1962 | Beaver et al. | 176—86 |
| 3,088,898 | 5/1963 | Busby et al. | 204—193.3 |
| 3,103,479 | 9/1963 | Ransohoff | 176—93 |

FOREIGN PATENTS

| | | |
|---|---|---|
| 1,239,165 | 7/1960 | France. |
| 835,257 | 5/1960 | Great Britain. |
| 926,133 | 5/1963 | Great Britain. |

OTHER REFERENCES

"Rare Earths as Nuclear Poisons," Lindsay Chemical Division Technical Report, by J. A. Ransohoff, March 1958, pp. 3, 4.

Schultz: "Control of Nuclear Reactors and Power Plants," pp. 400–401, publ. Mar. 6, 1961, by McGraw-Hill.

L. DEWAYNE RUTLEDGE, *Acting Primary Examiner.*

REUBEN EPSTEIN, CARL D. QUARFORTH,
*Examiners.*

J. F. DAVIS, M. R. DINNIN, *Assistant Examiners.*